United States Patent
Kitahara et al.

(10) Patent No.: US 7,428,074 B2
(45) Date of Patent: Sep. 23, 2008

(54) LOGO DATA GENERATING APPARATUS, LOGO DATA GENERATING METHOD, AND DATA STORAGE MEDIUM

(75) Inventors: Katsuhito Kitahara, Kagoshima-ken (JP); Yukiharu Horiuchi, Nagano-ken (JP); Kazuyuki Yokoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/835,910

(22) Filed: Aug. 8, 2007

(65) Prior Publication Data

US 2007/0285725 A1    Dec. 13, 2007

Related U.S. Application Data

(63) Continuation of application No. 10/033,548, filed on Dec. 27, 2001, now Pat. No. 7,283,275.

(30) Foreign Application Priority Data

Dec. 28, 2000    (JP)    .............................. 2000-403296

(51) Int. Cl.
*G06F 15/00*    (2006.01)
*G06F 3/12*    (2006.01)
*G06K 1/00*    (2006.01)
*G06K 15/00*    (2006.01)

(52) U.S. Cl. ..................................... 358/1.18; 358/1.14

(58) Field of Classification Search .................. 358/1.1, 358/1.15, 1.18, 1.16, 518; 705/25; 369/124.07
See application file for complete search history.

(56) References Cited

U.S. PATENT DOCUMENTS

| | | | |
|---|---|---|---|
| 4,837,613 A | 6/1989 | Paxton et al. | |
| 4,873,570 A | 10/1989 | Suzuki et al. | |
| 5,045,967 A | 9/1991 | Igarashi | |
| 5,146,346 A | 9/1992 | Knoll | |
| 5,467,196 A | 11/1995 | Fukushima et al. | |
| 5,581,375 A | 12/1996 | Ma | |
| 5,680,230 A | 10/1997 | Kaburagi et al. | |
| 5,740,333 A | 4/1998 | Yoh et al. | |
| 5,890,818 A | 4/1999 | Sansone | |
| 6,042,278 A * | 3/2000 | Spencer et al. ................ | 400/61 |

(Continued)

FOREIGN PATENT DOCUMENTS

EP    0596706    5/1994

(Continued)

OTHER PUBLICATIONS

Adobe Photoshop 5.0, 1998 Adobe Systems, Inc., User Guide for Macintosh and Windows, pp. 63-133.

(Continued)

*Primary Examiner*—Douglas Q Tran

(57) ABSTRACT

A logo data generating apparatus and method easily generate logo data suitable for storage to and output by a particular target printer without requiring a complicated process defining the image processing and data communication parameters. A source image obtaining unit obtains the source data used to generate the logo data. A model-specific data storage medium stores the model-specific data. A reading unit reads model-specific data for the target printer. A logo data generating unit generates the logo data by processing the source data based on the control data or the model-specific data. Specific control data is thus set automatically based on the model-specific data.

23 Claims, 8 Drawing Sheets

U.S. PATENT DOCUMENTS

| | | | |
|---|---|---|---|
| 6,188,493 | B1 | 2/2001 | Esaki et al. |
| 6,206,504 | B1 | 3/2001 | Payne |
| 6,247,028 | B1 | 6/2001 | Torisaki |
| 6,359,695 | B1 | 3/2002 | Takahashi et al. |
| 6,459,419 | B1 | 10/2002 | Matsubayashi |
| 6,486,966 | B1 | 11/2002 | Takahashi et al. |
| 6,490,053 | B1 | 12/2002 | Takahashi et al. |
| 6,502,923 | B2 | 1/2003 | Payne |
| 6,525,835 | B1 | 2/2003 | Gulati |
| 6,663,303 | B2 | 12/2003 | Horiuchi et al. |
| 6,847,377 | B2 | 1/2005 | Kitahara et al. |
| 6,961,710 | B1 | 11/2005 | Yanagisawa et al. |
| 7,085,006 | B2 | 8/2006 | Yokoyama et al. |
| 2002/0003162 | A1 | 1/2002 | Ferber et al. |
| 2002/0077892 | A1 | 6/2002 | Goring |
| 2002/0085476 | A1* | 7/2002 | Samari-Kermani |

FOREIGN PATENT DOCUMENTS

| | | |
|---|---|---|
| JP | 61208578 | 9/1986 |
| JP | 61250722 | 11/1986 |
| JP | 6288071 | 4/1987 |
| JP | 63060672 | 3/1988 |
| JP | 63172662 | 7/1988 |
| JP | 63256450 | 10/1988 |
| JP | 63298578 | 12/1988 |
| JP | 01112477 | 5/1989 |
| JP | 1206052 | 8/1989 |
| JP | 284364 | 3/1990 |
| JP | 2293921 | 12/1990 |
| JP | 03121571 | 5/1991 |
| JP | 4190466 | 7/1992 |
| JP | 4264915 | 9/1992 |
| JP | 06006600 | 1/1994 |
| JP | 624046 | 2/1994 |
| JP | 06217048 | 8/1994 |
| JP | 6227078 | 8/1994 |
| JP | 766974 | 3/1995 |
| JP | 766975 | 3/1995 |
| JP | 7175613 | 7/1995 |
| JP | 08052921 | 2/1996 |
| JP | 884268 | 3/1996 |
| JP | 08090767 | 4/1996 |
| JP | 08123631 | 5/1996 |
| JP | 8169142 | 7/1996 |
| JP | 8230269 | 9/1996 |
| JP | 8282016 | 10/1996 |
| JP | 08282022 | 10/1996 |
| JP | 08286860 | 11/1996 |
| JP | 966643 | 3/1997 |
| JP | 9135325 | 5/1997 |
| JP | 9200554 | 7/1997 |
| JP | 09247470 | 9/1997 |
| JP | 10051770 | 2/1998 |
| JP | 10086461 | 4/1998 |
| JP | 10134178 | 5/1998 |
| JP | 10148574 | 6/1998 |
| JP | 10149441 | 6/1998 |
| JP | 10164380 | 6/1998 |
| JP | 10302063 | 11/1998 |
| JP | 1169173 | 3/1999 |
| JP | 11070780 | 3/1999 |
| JP | 2000185450 | 7/2000 |
| JP | 2000322373 | 11/2000 |

OTHER PUBLICATIONS

"Post Office Site", http://www.joshuatreevillage.com/228/po.htm.
"Tech 316 and 550 Weekly Assignments", http://www.technology.ewu.edu./Tech316/ComGA1.htm.
Ithaca—Press Release, "Transact Technology's Color Inkjet Printer Provides New Marketing Opportunities", Apr. 17, 2000, 1 page.
Ithaca—Press Release, "Transact Unveils Color Inkjet Printer; Turns The World of POS Upside Down", Apr. 17, 2000, 1 page.
Ithaca—Press Release, "Transact's New POSjet Chosen For Peripheral Systems Techtour At Retail Systems 2000", Apr. 17, 2000, 1 page.
Ithaca—Press Release, "Transact's New Color InkJet POS Printer Meets Hospitality Industr Needs And Is Also A Brand Builder", Apr. 20, 2000, 1 page.
Ithaca—"How To Use The PJ1000 Image Converter", before Apr. 17, 2000, 12 pages.

* cited by examiner

LOGO DATA GENERATING APPARATUS, LOGO DATA GENERATING METHOD, AND DATA STORAGE MEDIUM

CROSS-REFERENCE TO RELATED APPLICATIONS

This application is a continuation of U.S. application Ser. No. 10/033,548 filed on Dec. 27, 2001, which is hereby incorporated by reference in its entirety.

BACKGROUND OF THE INVENTION

1. Field of the Invention

The present invention relates to a logo data generating apparatus and method for creating logo data stored in a printer, and relates further to a data storage medium embodying a computer-executable program for directing a computer to execute the steps of this method.

2. Description of the Related Art

Modern POS (point-of-sale) systems combine the functionality of a conventional cash register used to smoothly handle the exchange of money in conjunction with a product purchase with functions for collecting and analyzing information relating to the purchased products. POS systems are widely used in the sales and distribution industry, particularly by large and small retailers such as department stores and supermarkets. A POS system typically consists of a server or central computer for serving, collecting and analyzing data, and a number of POS terminals connected to the server or central computer. Each POS terminal is itself also a system and typically consists of a host computer for handling local data processing operations, a line display or other display device, a scanner for reading product bar codes, a cash drawer, and a printer (POS printer) for printing sales receipts and/or other forms.

In addition to the names of the purchased products, quantity, unit price and total cost information, receipts printed by a POS printer typically also have a logo containing the name of the store or company and an identifying brand mark. The logo can also contain image information such as an illustration, product picture, and a graphic design of the product name, for example. This logo printing function can be used to print advertising containing text and images on the receipt so that receipts can also be used as an advertising medium or sales promotion medium.

Logos such as these printed to a receipt consist of digital image data (this logo image data is referred to herein as the "logo data"). Digital images are generally relatively large, which means that the effective printer throughput is reduced when the logo data is sent from the host to the printer each time a receipt is printed.

Color logos can also be printed for even greater advertising effect by using a color printer for the POS printer. Color images, however, are even larger than black and white images and even more time is therefore required for processing the image, receiving the logo data by the printer, and printing. This further slows the printing speed and throughput. At the same time fast printing is essential at a POS terminal because it is desirable to register the purchased products, issue a receipt, and complete transactions at the point of sale as quickly as possible.

With this type of POS printer it is therefore common to store the logo data in the printer so that a logo print command can be simply sent to the printer to read and print the image from memory, thereby achieving high speed printing by saving the time required to transmit the image data when printing a receipt. The logo data is usually stored in the printer using a logo data registration (storage) device.

By thus storing the logo data in the printer before printing it is no longer necessary to send the logo data from the host to the printer when printing, thereby reducing the print data processing time on the host and reducing data transmission requirements. Printing can also be completed more quickly because it is not necessary to send the logo data to the printer.

The size of the printing paper, print resolution, and communication parameters can also differ greatly according to the model of POS printer. With color POS printers even the colors of ink that can be printed (referred to below as the "printable colors") are limited by the printer model, and the printable colors can even be different in the same model. It is therefore necessary to generate the logo data stored to the printer so that the logo data conforms to such model-specific printer specifications as the print resolution, printable colors, and other printer features and the width of the printing paper. The logo data is therefore generated by first creating the basic image data from which the logo is derived (the "source data" below), then adjusting the size, color, resolution, and other features of the source data according to the characteristics of the target printer. The resulting logo data is then stored to the POS printer using a logo data registration tool. It is therefore necessary to define the model-specific data for the target printer, color reduction method, color assignment, and other specific settings as parameters of the process for generating the logo data from the source data. These settings include numerous items such as the printing paper size and printer resolution. A specific image process is then applied according to the logo size, resolution, print colors, and other parameters based on the printer settings. The communication parameters of the target printer are also set when the logo data is stored to the printer. If these settings are incorrect, problems such as not being able to register or print the logo may occur. Even if the same logo data is registered to multiple identical printers, it is necessary with the method of the prior art to define the above parameters individually for each target printer to which the logo data is to be registered, thus requiring much time and an overly complex procedure.

Once color logo printing becomes possible, it is also expected that POS printers will be more commonly used to print product advertisements, product and service coupons, and other such information on receipts. On the other hand, such advertisements and announcements change frequently so that unlike printing conventional store logos it is also expected that it will be necessary to frequently create new logo data containing current information for a specific purpose (such as promotions and event announcements).

There is therefore a need to be able to register new logo data as quickly and easily as possible, and to edit and change logo data as quickly and easily as possible.

OBJECTS OF THE INVENTION

The present invention is directed to resolving the problems described above, and an object of this invention is to provide a system and a method for generating logo data quickly and easily for registration in a printer.

A further object is to provide a data storage medium embodying a computer program containing code for executing the method of the invention.

SUMMARY OF THE INVENTION

To achieve these objects, one aspect of the present invention provides a logo data generating apparatus that is configured to store model-specific data containing such printer-specific information as the printing paper size, print resolution, and printable colors, and that creates the logo data by setting processing parameters for creating the logo data based on this model-specific data. Based on the stored printer information, the logo data can be stored directly to a target printer, or can be saved in a format enabling the logo data to be stored to the target printer.

More specifically, a first aspect of the invention involves an apparatus for generating logo data to be stored in and printed by a printer. The apparatus comprises a source data obtaining unit configured to obtain source data used to generate the logo data; a reading unit configured to read model-specific data for at least one target printer from respective model-specific data stored for a plurality of printer models; a logo data generating unit configured to generate the logo data by processing the source data based on the model-specific data read by the reading unit; and a storage unit configured to store the logo data generated by the logo data generating unit.

In this aspect of the invention, the model identification data identifying the model of a particular target printer can be input by a user or can be read automatically from a connected printer. The model-specific data can also be defined as desired to, for example, determine the number of colors that the target printer can print and the print resolution of the target printer. This eliminates the need to manually input the target printer characteristics when generating the logo data, and thus makes it possible to quickly and accurately set parameters for logo data generation.

In this aspect of the invention the model-specific data can be limited to data that can be identified by the model identification data. This reduces the possibility for data input errors.

Receipt of some or all items for which setting is not required based on previously received or set control data can be disabled. Doing so, makes it possible to assure that accurate data is not replaced with erroneous control data.

Yet further preferably, some or all control data can be initialized to respective specific values that can be changed based on other data received by the apparatus. Image processing can thus be performed, if desired, based on the initialization values without requiring data input.

The receiving unit can be configured to specify the colors available for printing in, or print resolution of, the target printer. Logo images conforming to the ink colors that can actually be printed by a color logo printer can thus be created.

The logo data generating unit can assign source data colors to specific colors printable by the target printer based on the model-specific data. This makes it possible to freely assign the colors of a full color source data image to the colors that can be printed by the printer, and thus enables color assignments achieving the most desirable printed logo.

The stored model-specific data may include communications parameters for each of the plurality of printer models, and the reading unit can set communications parameters for sending logo data to the target printer based on the model-specific data. This makes it easier to input the communications parameters for storing logo data to the printer.

Preferably, the logo data generating apparatus also includes an output unit configured to output the generated logo data. This output unit can output a file containing the logo data, a printer registration command for storing the logo data in the target printer, and a data transmission command for sending the printer registration command and logo data to the target printer. This makes it possible to easily register the logo data in the target printer. Alternatively, this output unit can send the logo data and a command that causes the target printer to store the logo data therein. This makes it possible to store the logo data directly in the target printer.

The receiving unit can have a graphical user interface input function. This makes it easier for the user to input settings data.

The receiving unit need not display some or all input items for which setting is not required based on received data. This simplifies the display screen and thus simplifies operation and data input errors.

Preferably, the logo data generating apparatus further includes a display adapted to display an image based on the source data and an image after processing by the logo data generating unit. This enables image-processing parameters to be set while referring to both the source data image and the logo data print image. The display can also be adapted to display the images aligned for comparison on one side of the display. This makes appropriate image processing easier because the settings can be input while comparing the images.

In another aspect of the invention, a logo data generating system comprises memory for storing a printer model name and a predetermined number of printable colors, and print resolution of the printer model; a reading unit for reading (or receiving) source data to obtain image data provided for printing as logo data; a display unit for reading and displaying the printer model name, number of printable colors, and print resolution stored in memory; a selection unit for selecting a target printer for printing out the logo data from among the printer model names displayed on the display unit; and a logo data generating unit for processing the source data to create logo data for printing based on the model name of the target printer selected by the selection unit and the number of printable colors, and print resolution of the selected target printer.

In such a logo data generating system, the memory may also store paper width attributes of the printer model, the display unit may display the stored paper width attributes, and the logo data generating unit may process the source data to create logo data for printing also based on the paper width attributes of the selected target printer.

The logo data generating system may further comprise a data transmission unit for sending the logo data generated by the logo data generating unit to the target printer. A second memory unit may also be provided for storing the logo data generated by the logo data generating unit.

According to another aspect of the invention, a method for generating logo data to be stored in and printed by a printer comprises the steps of: (a) obtaining source data; (b) reading, based on model identification data, model-specific data for the at least one target printer from respective model-specific data stored for a plurality of printer models; (c) generating logo data by processing the source data obtained in step (a) based on the model-specific data read in step (b); and (d) storing the generated logo data.

Preferably, step (c) comprises assigning source data colors to specific colors printable by the target printer based on the model-specific data read in step (b).

Preferably, step (c) comprises converting the size of the image represented by the source data and the resolution of that image to a paper width and print resolution, respectively, usable by the target printer as specified in the model-specific data.

Step (b) may comprise reading data via a graphical user interface input.

The logo data generating method may further include the step of outputting the generated logo data. This step may entail outputting an executable file containing the logo data and a data transmission program for sending the logo data and a command causing the target printer to store the logo data therein. Alternatively, this step may entail sending the logo data and a command causing the target printer to directly store the logo data therein.

A further aspect of the present invention involves a data storage medium embodying a computer program for directing the execution of the logo data generating method described above.

DESCRIPTION OF THE PREFERRED EMBODIMENTS

Embodiments of the present invention are described below with reference to the accompanying figures. It will be noted that the following embodiments are presented by way of example only and are not intended to limit the scope of the invention. From the following disclosure, it will be apparent to one skilled in the related art that various alternative embodiments can be achieved by replacing some or all of the elements described below with equivalent elements. Such variations are included in the scope of this invention.

Embodiment 1

Figure 1:
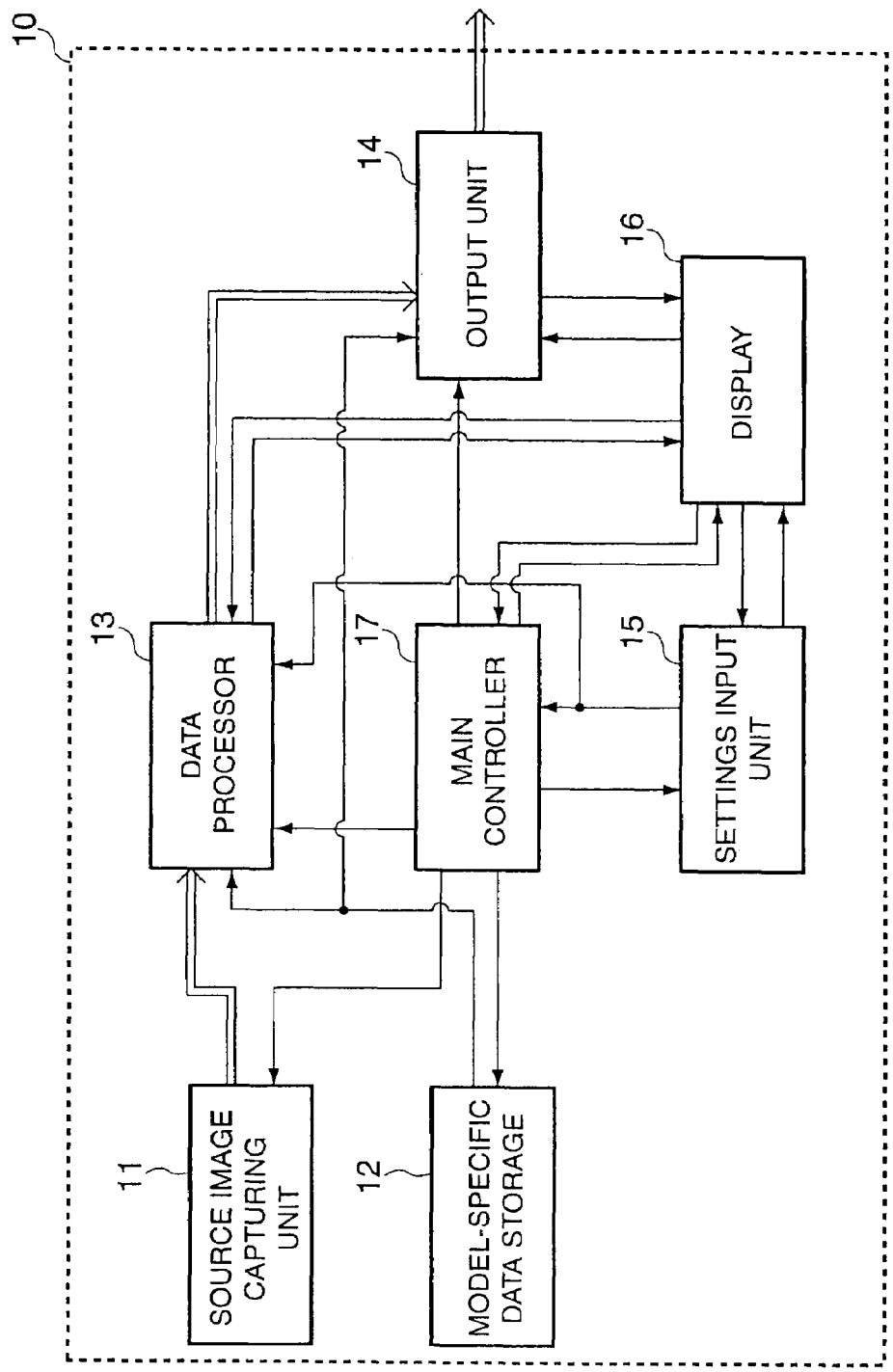
FIG. 1 is a functional block diagram of a logo data generating system according to a first embodiment of the present invention.

FIG. 1 is a block diagram showing the functions of a logo data generating system 10 according to a first embodiment of this invention. As shown in FIG. 1 this logo data generating system 10 has a source image capturing unit 11, model-specific data storage 12, data processor 13, output unit 14, settings input unit 15, display 16, and main controller 17 for controlling these other functions.

The logo data is created from source data normally stored in a hard disk drive or other storage device (not shown in the figures) provided externally to the logo data generating system 10. The source image capturing unit 11 reads the source data from such storage device under the control of the main controller 17. For example, when the user specifies the desired source data file, the main controller 17 instructs the source image capturing unit 11 to capture the data from that file and then store it. The source data can be stored in the source image capturing unit 11 temporarily until generating the logo data for printer registration is completed, or can be stored for a longer period if it will be used again to create different types of logo data based on the same source data.

Two general types of files are also used to store the source data. First are files created in a format (referred to herein as "ELF files") by a logo data editing system (not shown in the figures). Second are bitmap files and other common image files.

The logo data editing system referred to above may be of the type described in the U.S. patent application filed on Dec. 13, 2001 and identified by a. Such logo data editing system can, for example, combine multiple images together with text in a single source data file, which is then output as an ELF file.

Model-specific data for a plurality of different printer models is stored in the model-specific data storage 12. This model-specific data includes the name of the printer model, usable paper sizes (particularly width), printable colors, vertical print resolution, horizontal print resolution, communication parameters, as well as such model-specific communication specifications as the port, baud rate, bit length, parity check, flow control, and other parameters specific to a particular model.

This preferred embodiment is described using a printer with two printable colors, referred to herein as the first color and second color. It will be apparent from this description, however, that the invention can be applied to a printer with three or more printable colors, or to a monochrome printer.

Controlled by the main controller 17, the data processor 13 reads the source data captured and stored by the source image capturing unit 11, and reads the model-specific data from the model-specific data storage 12 to determine the data processing parameters. The controller 17 could also read the printable colors, paper size, printer resolution, and other model-specific data to set the data processing parameters for the data processor 13. In this case the controller 17 functions as the model-specific data setting unit. The data processor 13 then processes the source image according to the model-specific data and settings from the settings input unit 15 to generate the logo data to be stored in the printer. More specifically, this operation processes and adjusts the pixel count, color information, and other source data features according to the model-specific data, including the paper width, printer resolution, and other features of the printer that will print the logo data. Printer model identification data specifying the target printer model, and control information including settings determining the image processing parameters, can be input from the settings input unit 15.

For example, if the print resolution of the printer is lower than the expected resolution of the source data, the printed image will be larger than the expected size if it is printed at the pixel count of the source data. The area of the printed logo on the receipt will therefore differ from the initial design, and if the source data was designed to be printed to the full width of the paper, part of the logo will spill over the edge of the paper and thus not be printed.

It is therefore necessary to reduce the image (that is, reduce the pixel count) if the intended print resolution of the source data is different from (is higher than) the resolution of the printer. It is desirable in such cases to consider the width of the printing paper (receipt). If the printer can only print using two colors of ink (two printable colors) and the source data has more colors, it is also necessary to reduce the source data to the two printable colors. A color reduction process is therefore needed to assign the plural colors of the source data to the first and second printable colors of the printer.

The color assignment process can be initialized to particular printable colors and printable color assignments, which are then set automatically based on the model-specific data when the logo data is produced. The user could also define the color assignments as desired rather than using such initialized settings. In general the colors actually printed by a two-color printer can be controlled by simply changing the ink cartridges, for example. This means that while the model-specific data indicates that the printer can print two colors, which colors are actually printed can be freely selected when the logo data is created.

Designing the logo data generating process to automatically set minimum image processing parameters according to the printer model based on the model-specific data means that the user does not need to individually enter detailed printer information each time logo data is edited, thus reducing input errors and making operation easier for the user. This makes it possible to prevent, for example, mistakenly processing the logo data for printing on a two-color printer when the logo data will be printed on a monochrome printer, or creating a logo that is too big to print on the paper as a result of setting the wrong print resolution. Furthermore, if it is desirable to change the color reduction method for a particular object in existing logo data, the corresponding editing process could be entered immediately by simply inputting the model identification data. Similarly, if the user wants to change the color of a particular object, or change the halftone process or gray scale process, the corresponding editing process can be started immediately by simply inputting the model identification data. By thus automatically setting the data processing parameters, it is therefore possible to make minor final changes to essentially completed logo data, make changes to completed logo data, and generate the initial logo data, by simply specifying the printer model without manually inputting the detailed settings.

The logo data must be sent to the printer in order to store the logo data in the printer, and it is therefore also necessary to set the printer communication parameters. The data read by the model-specific data storage 12 in the present invention includes such printer communication settings as the port, baud rate, bit length, parity check, and flow control settings, which are sent to the main controller 17 or output unit 14 to set the logo data communication parameters. Minimal input from the user is therefore required.

If the output unit 14 generates an executable file as described below (a logo file containing a printer storage command), the logo data can be registered by simply opening this file on the host terminal to which the target printer is connected if the communication parameters are embedded in the data communication command set. Setting the printer communication parameters is complicated and requires specialized knowledge. It is therefore particularly advantageous to be able to set the communication parameters automatically based on the model-specific data.

The output unit 14 can store the logo data output from the data processor 13 as a file (an "executable file" below) containing the logo data, a command for sending the logo data to the printer, and a program for transferring the logo data to the target printer. The logo data to be stored in the printer can also be converted to a bitmap format and stored as bitmap data.

The resulting logo data and executable file can be stored in memory (not shown in the figures) in the output unit 14. The logo data and executable file can also be stored in the logo data generating system 10 or in an external storage device (not shown in the figures). The stored logo data can also be read as source data used to create new logo data, and when a new printer model is introduced, for example, existing logo data can be easily converted to logo data appropriate to the new model by simply setting the model-specific data for the target printer.

By providing a function for easily setting the data processing parameters needed to create logo data and the communication parameters for registering the logo data in a printer, this embodiment of the invention makes it possible to quickly and easily create logo data to be stored in a printer and enables the logo data to be quickly saved to the printer.

Embodiment 2

Figure 2:
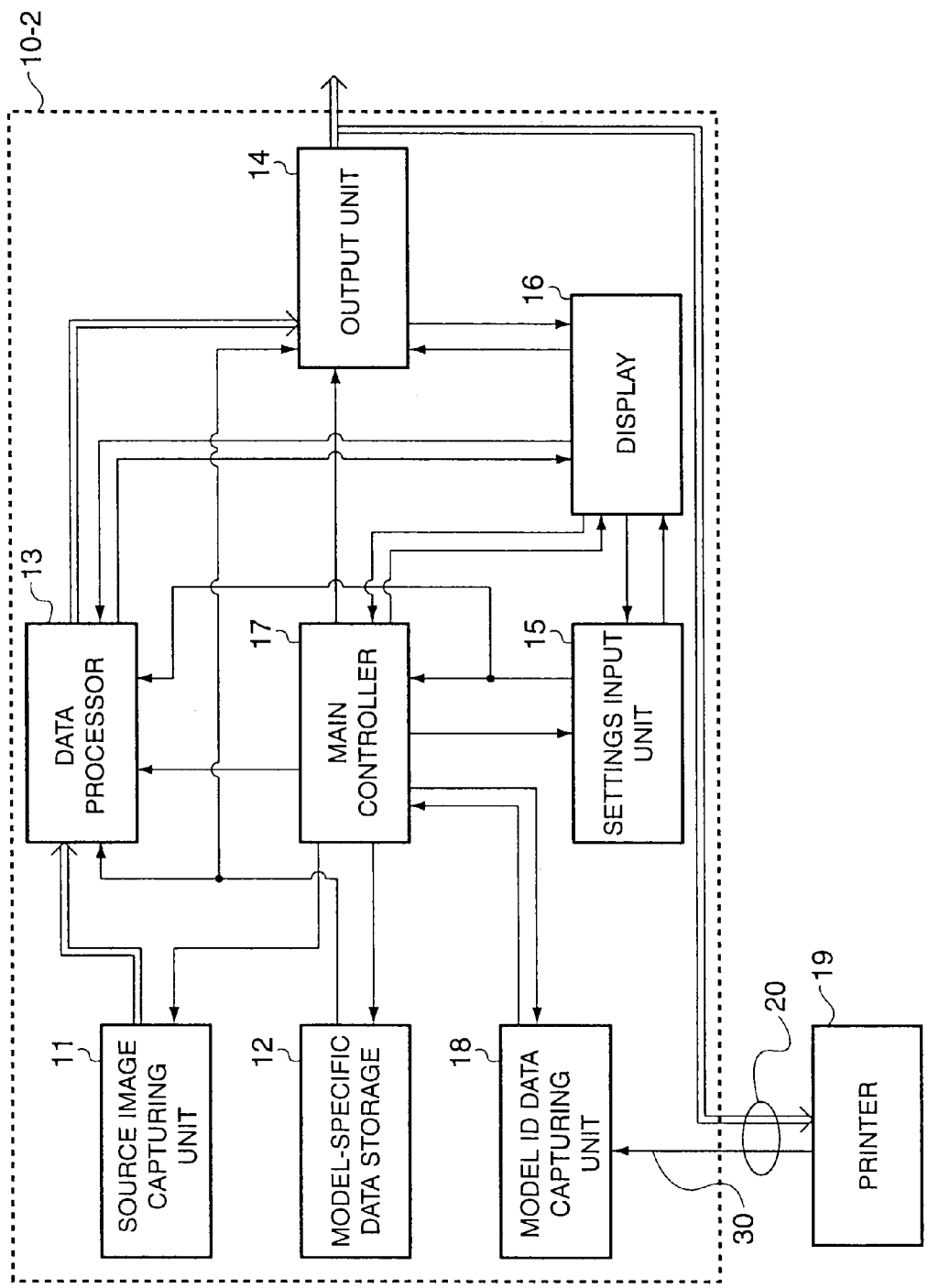
FIG. 2 is a functional block diagram of a logo data generating system according to a second embodiment of the present invention.

FIG. 2 is a block diagram showing the functions of a logo data generating system 10-2 according to a second embodiment of the present invention. Like parts in the logo data generating system 10-2 of this second embodiment and the first embodiment are identified by the same names and reference numerals. The logo data generating system 10-2 of this embodiment additionally has a model ID data capturing unit 18 connected to the printer 19 via a communication bus 20. The target printer is identified in the first embodiment above as a result of the user inputting model identification data specifying the target printer model. In this second embodiment, however, the model identification data is stored in the printer 19 so that it can be read directly from the printer 19. The logo data generating system 10-2 of this embodiment therefore has a model ID data capturing unit 18 for reading the model identification data stored in the printer 19. Line 30 in FIG. 2 schematically indicates that the model ID data capturing unit 18 reads the model identification data from the printer 19.

The main controller 17 identifies the model of printer 19 from the model identification data read by the model ID data capturing unit 18. Based on the identified printer model, the main controller 17 then reads the model-specific data from the model-specific data storage 12 and sets up the data processor 13.

If the model identification data cannot be read by the model ID data capturing unit 18, the model ID data can be input by the user as described in the first embodiment.

In addition to a function for storing the logo data as an executable file or a bitmap file as described in the first embodiment, the output unit 14 also has a function for sending the logo data output by the data processor 13 and a storing command to the printer via communication bus 20. It also has a function for storing the logo data directly in the printer. This logo data communication function and function for directly storing the logo data in the printer can also be provided in the first embodiment by connecting the logo data generating system and printer with a communications cable.

The functions of the source image capturing unit 11, data processor 13, settings input unit 15, and display 16 in this second embodiment are identical to those in the first embodiment.

The communication bus 20 can be a serial cable, parallel cable, network cable, USB, or other data communication format. It will also be apparent that communication between the logo data generating system 10-2 and printer 19 shall not be limited to a physical communication cable. For example, a wireless communication system known from the literature, including IrDA (Infrared Data Association) or other infrared communication system, or wireless LAN technology using spread spectrum communication, could be used to connect the printer.

FIG. 2 shows a single printer 19 connected to the logo data generating system 10-2. A POS system, however, typically has multiple printers. Multiple printers could therefore be connected via a LAN so that the model identification data can be read from each of the printers.

Figure 3:
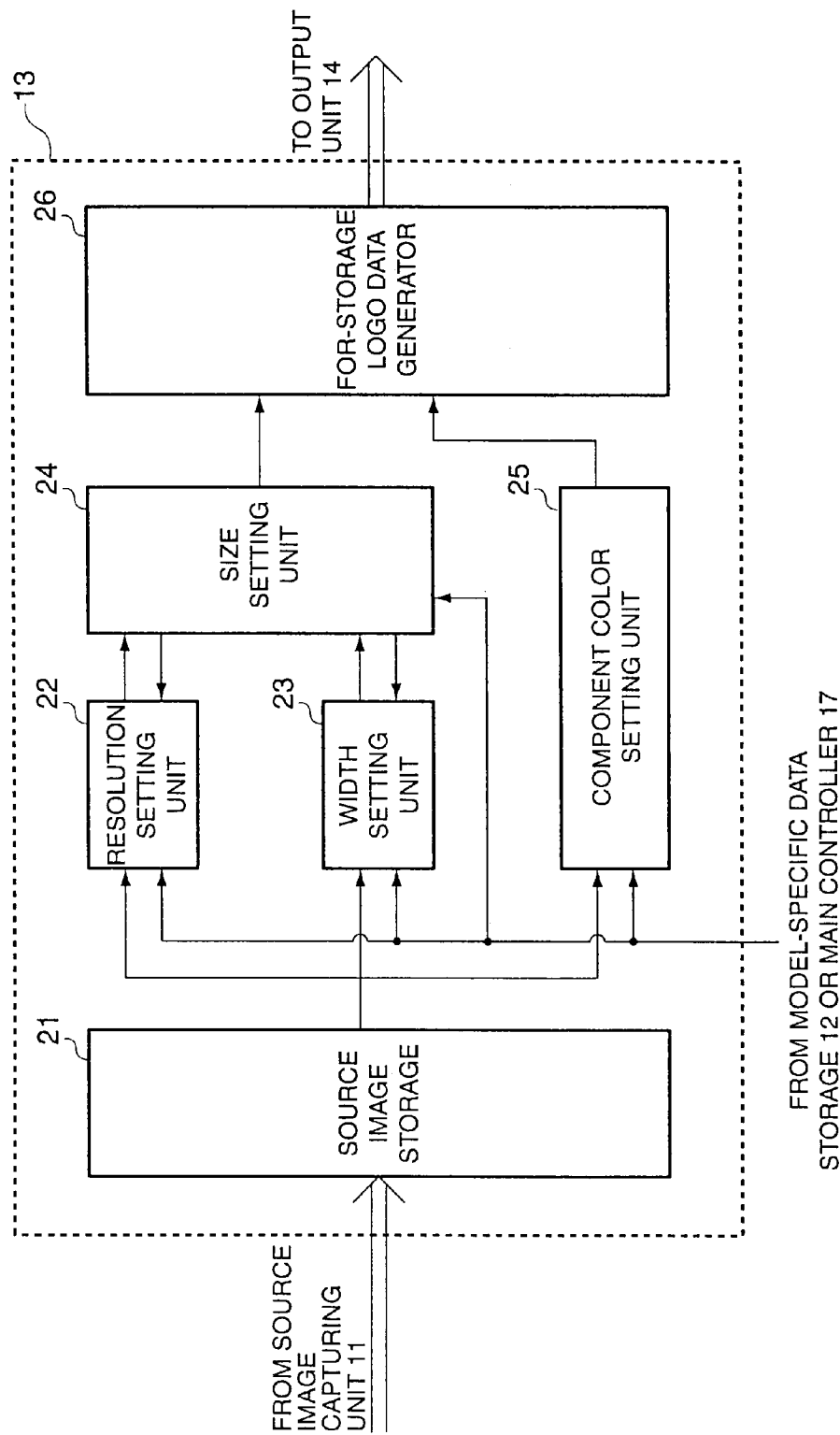
FIG. 3 is a functional block diagram illustrating in further detail the data processor shown in FIG. 1 or FIG. 2.

The functions of the data processor 13 are described in further detail below with reference to FIG. 3, which is a functional block diagram of the data processor 13 shown in either FIG. 1 or FIG. 2. As shown in FIG. 3 the data processor 13 has source image storage 21, resolution setting unit 22, width setting unit 23, size setting unit 24, component color setting unit 25, and logo data generator 26.

The present invention automatically sets image processing parameters based on the model-specific data in order to produce logo data appropriate to printer performance and prevent generating logo data incompatible with the target printer.

The source image storage 21 reads and stores the source data for image processing from the source image capturing unit 11 (FIG. 1 or FIG. 2). The resolution setting unit 22 processes the source data so that the resolution conforms to the print resolution defined in the model-specific data, and the width setting unit 23 adjusts the width of the source data to conform to the width of the paper used in the printer as defined in the model-specific data. The size setting unit 24 drives image processing by the resolution setting unit 22 and width setting unit 23, combines the results therefrom, and confirms that the size of the final source data conforms to the paper size of the printer. The component color setting unit 25 processes the colors of the source data to match the printable colors defined in the model-specific data. This image processing step applies, for example, to color reduction, brightness, and gray scale level. Based on the image processed source data output from the size setting unit 24 and component color setting unit 25, the logo data generator 26 then generates the logo data for printer storage. It will be noted that the resolution setting unit 22, width setting unit 23, size setting unit 24, and component color setting unit 25 are shown in FIG. 3 as the structure for setting the model-specific data, but it will also be apparent that additional structure can be provided or one or more of these could be omitted.

Figure 4:
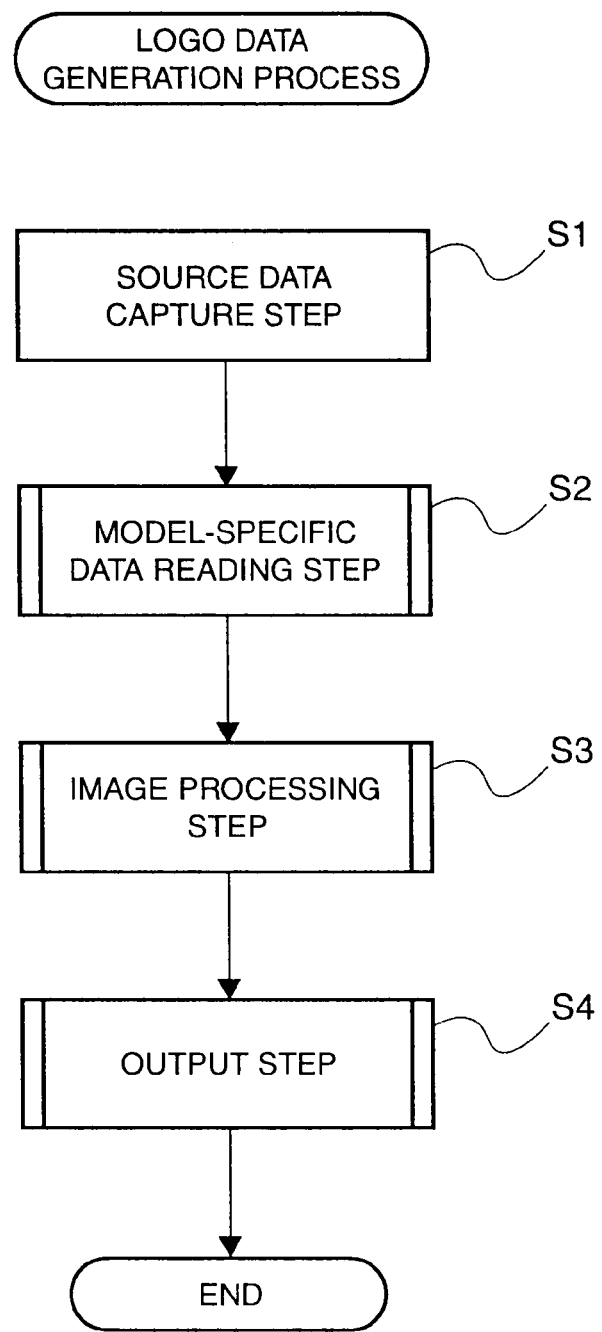
FIG. 4 is a flow chart of a logo data generating method according to a preferred embodiment of the present invention.

FIG. 4 is a flow chart of a logo data generating method according to a preferred embodiment of the invention. This logo data generating method has a source data capture step (S1) for capturing and storing the source data used to generate the logo data, a model-specific data reading step (S2) for reading the model-specific data for the printer based on the model identification data, an image processing step (S3) for generating the logo data by processing the source data based on the model-specific data read in step S2, and an output step (S4) for outputting the resulting logo data.

Figure 5:
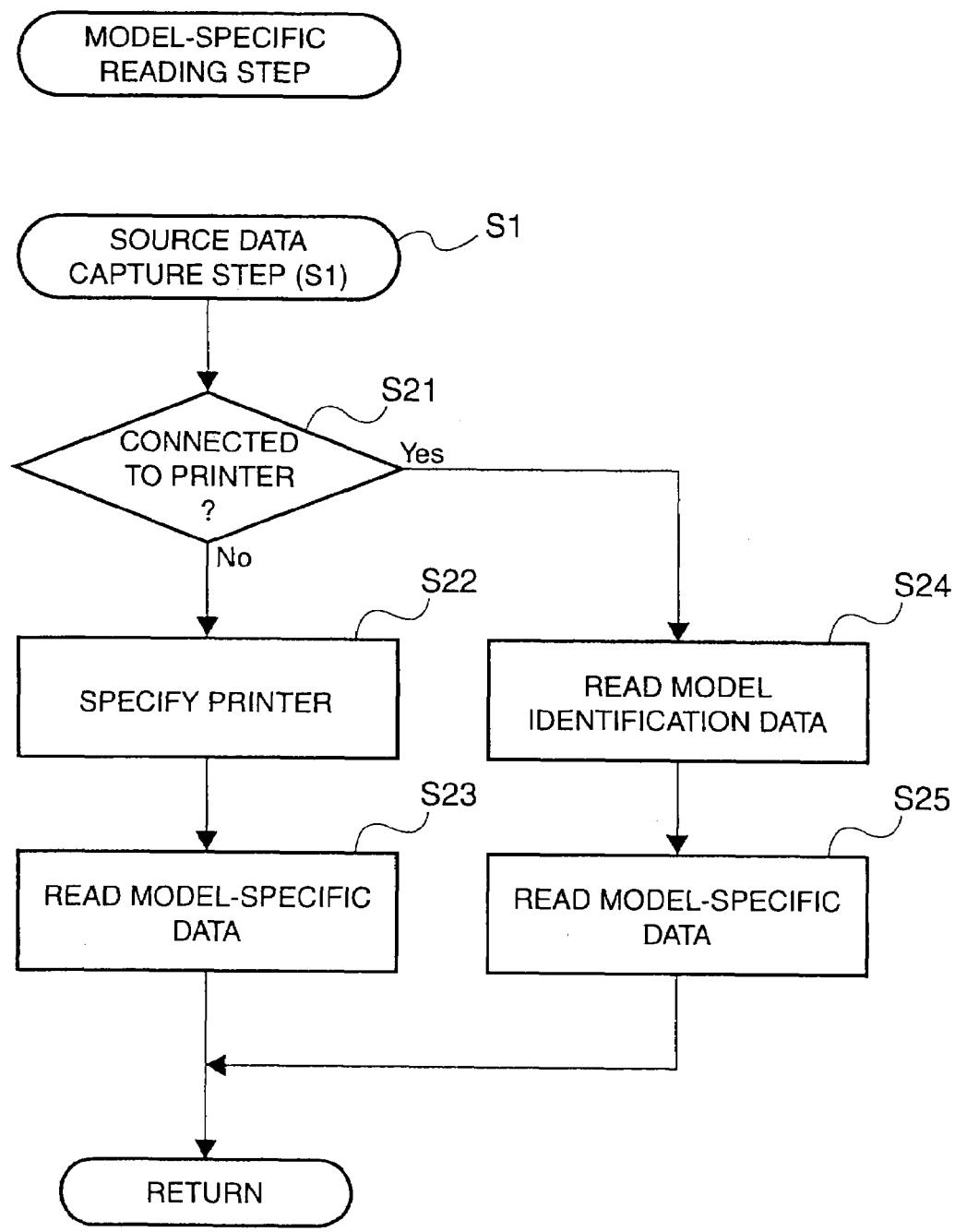
FIG. 5 is a flow chart showing in detail the model-specific data reading and setting step in FIG. 4.

The model-specific data reading step (S2) in FIG. 4 is described in further detail with reference to FIG. 5, which is a flow chart showing a preferred embodiment of the model-specific data reading step (S2). The steps executed after the source data is obtained and stored in step S1 in FIG. 4 are determined based on whether or not a printer is connected to the logo data generating system (S21). If a printer is not connected (S21 returns no; equivalent to the above first embodiment), the model identification data is input (S22). The main controller 17 then determines the printer model based on the supplied model identification data, reads the corresponding model-specific data, and applies the settings to the data processor 13 (S23). Once the model-specific data is read and the settings are completed, control advances to step S3 in FIG. 4.

If a printer is connected (S21 returns yes; equivalent to the above second embodiment), the model identification data stored to the printer 19 is read by the model ID data capturing unit 18 (S24). The main controller 17 then determines the printer model based on the model ID, reads the corresponding model-specific data, and applies the settings to the data processor 13 (S25). Once the model-specific data is read and the settings are completed, control advances to step S3 in FIG. 4. Note that it is also possible to omit step 21 confirming whether a printer is connected, and proceed directly to step S22 so that the user inputs the model identification data even when a printer is connected.

Figure 6:
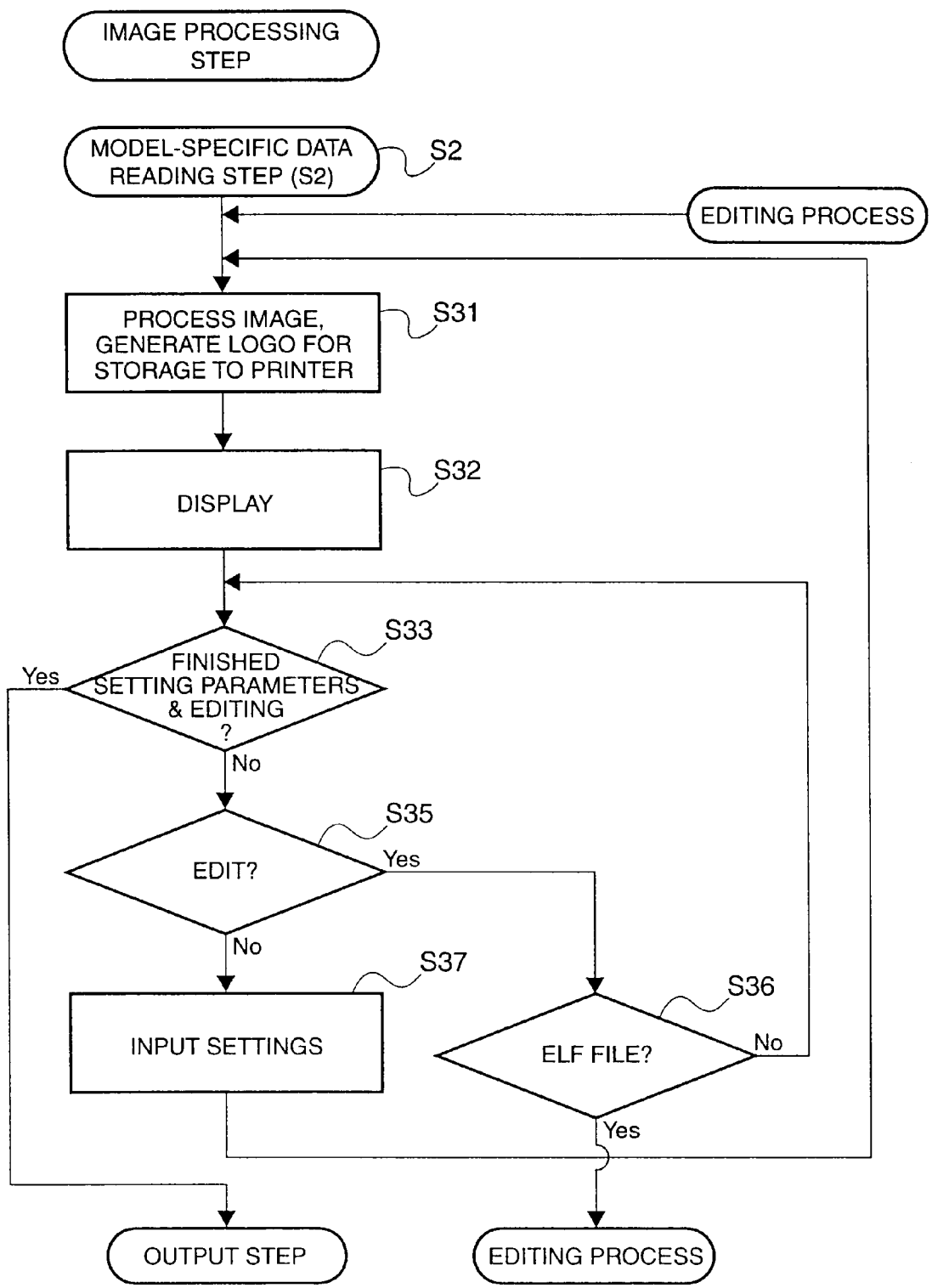
FIG. 6 is a flow chart showing in detail the image processing step in FIG. 4.

The image processing step (S3) in FIG. 4 is described in further detail with reference to FIG. 6, which is a flow chart showing a preferred embodiment of the image processing step (S3) in FIG. 4. When reading and setting the model-specific data in the model-specific data reading step (S2) in FIG. 4 is completed, logo data for registration in the printer is generated by processing the source data to adjust the width, resolution, and colors of the source data, for example, to the width of the paper used by the printer, the print resolution, and the printable colors defined in the model-specific data (S31).

The resulting logo data is then previewed for the user, that is, a print image of the logo data is presented on the display of the logo data generating system (S32). The source data read in the source data capture step (S1) is also displayed at this time. The user is thus able to confirm the print image of the source data on the display and decide if further manual adjustment of the logo image is required or whether further editing of the source data is required. Whether the logo is acceptable and the editing process is completed is then determined (S33).

If the user determines that further editing of the logo data or editing of the source data is needed (S33 returns no), whether source data is desired is determined (S35). If further source data editing is selected (S35 returns yes), the user confirms whether the source data is an ELF file (S36). If the source data is an ELF file (S36 returns yes), editing to change the size and colors of the source data by a logo data editing system is possible. In this case the logo data generating system is temporarily exited, and control passes to the logo data editing screen (not shown in the figures) of the logo data editing system to edit the source data. As noted previously, an ELF file can store both images and text in a single file, and both images and text can therefore be edited in a single file. Note that "editing" as used here means to change part of the source data image by, for example, changing the background of the source data to a different background. The re-edited source data is stored in the logo data editing system. When editing is completed the logo data generating system is started up again and control returns to step S31, where image processing is applied to the re-edited source data, and new logo data reflecting the edited source data is generated.

If the source data is not an ELF file (S36 returns no), the procedure loops back to step S33 and the user again decides whether editing the logo data is completed (S33). If the user decides to continue editing the logo data (S33 returns no) and step S35 also returns no, the settings for the next pass through the image process are input (S37). The color reduction process, printable colors, color assignment, brightness adjustment, gray scale adjustment, and other image processing parameters can be set in step S37. Once the settings are completed, the procedure loops back to step S31 and the logo data is processed according to the new settings.

The resulting print image is then previewed (S32). If the user indicates that editing is finished and the logo is completed (S33 returns yes), the procedure advances to the output step (S4 in FIG. 4).

Figure 7:
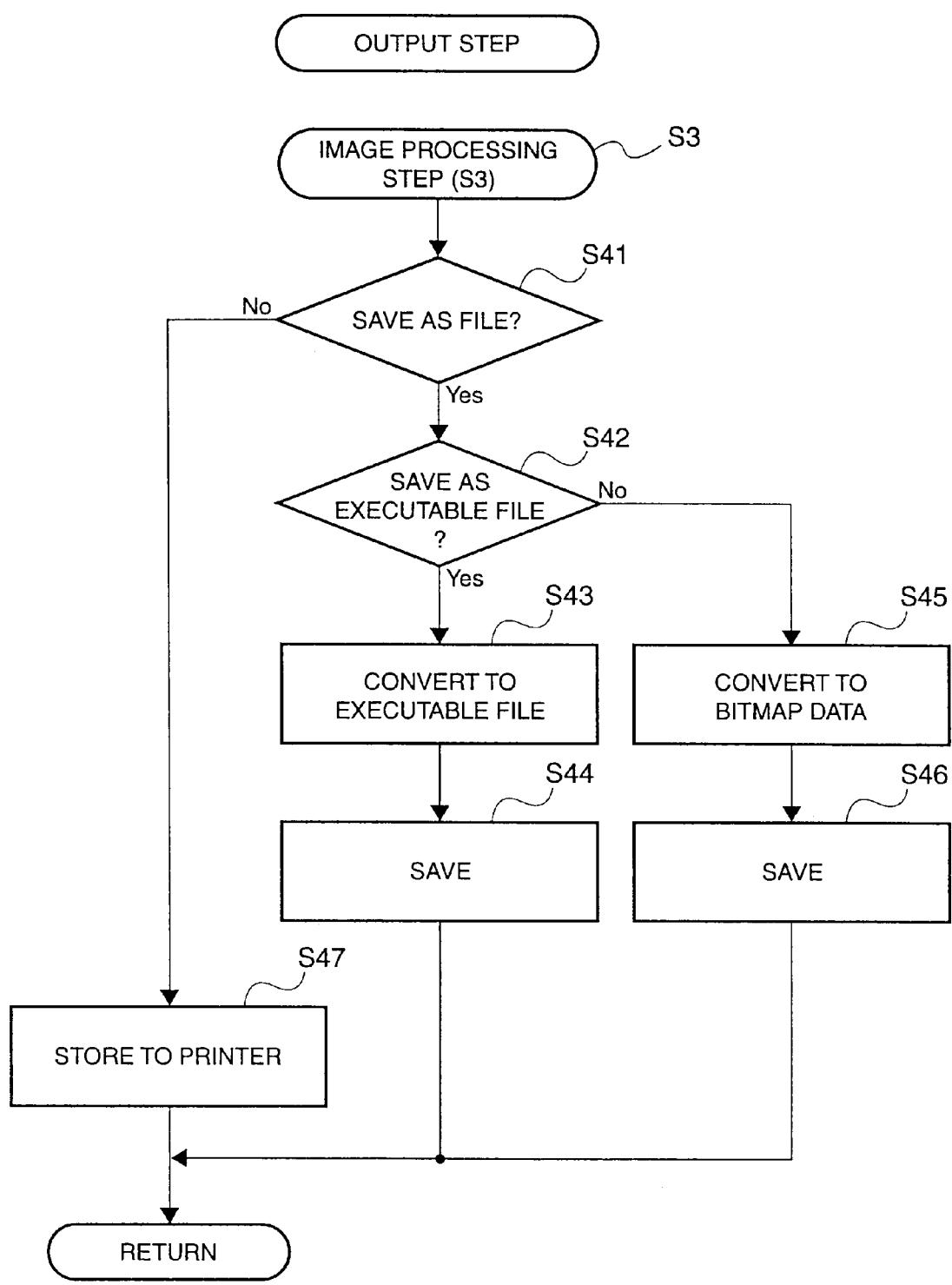
FIG. 7 is a flow chart showing in detail the output step in FIG. 4.

The output step (S4) in FIG. 4 is described next with reference to FIG. 7, which is a flow chart of a preferred embodiment of the output step (S4 in FIG. 4). The user controlling logo file generation can select the output format for the file using an input device in this embodiment of the invention. The output step (S4) therefore confirms whether to output the logo data directly to the printer for storage therein, or first store the logo data in a file, and then complete the selected operation.

More specifically, the output step first confirms whether to output directly to the target printer or store the logo data in a file (S41). If saving the logo data as a file is selected (S41 returns yes), the user is asked whether to save the file as an executable file or as a bitmap file (S42).

If the user chooses to store the file as an executable file (S42 returns yes), an executable file containing the logo data, a command for storing the logo data in the target printer and a program for sending the logo data to the printer are created (S43). The resulting executable file is then stored in the output unit 14 or in an external storage device or memory (S44), and the procedure ends.

If the user chooses to store the logo data as a bitmap file and not an executable file (S42 returns no), the logo data is converted to a bitmap format (S45). The converted data is then stored in the output unit 14 or in an external storage device or memory (S44), and the procedure ends.

The system can also be configured so that both bitmap and executable files can be read after being saved for subsequent image processing, or can be stored to the printer (S47). If the user indicates in step S33 in FIG. 6 that logo data editing is finished and selects to save the file to the printer (S41 returns no), the logo data and a command instructing the printer to store the logo data are sent to the target printer, the completed logo data is thus stored to the target printer (S47), and the procedure ends.

Figure 8:
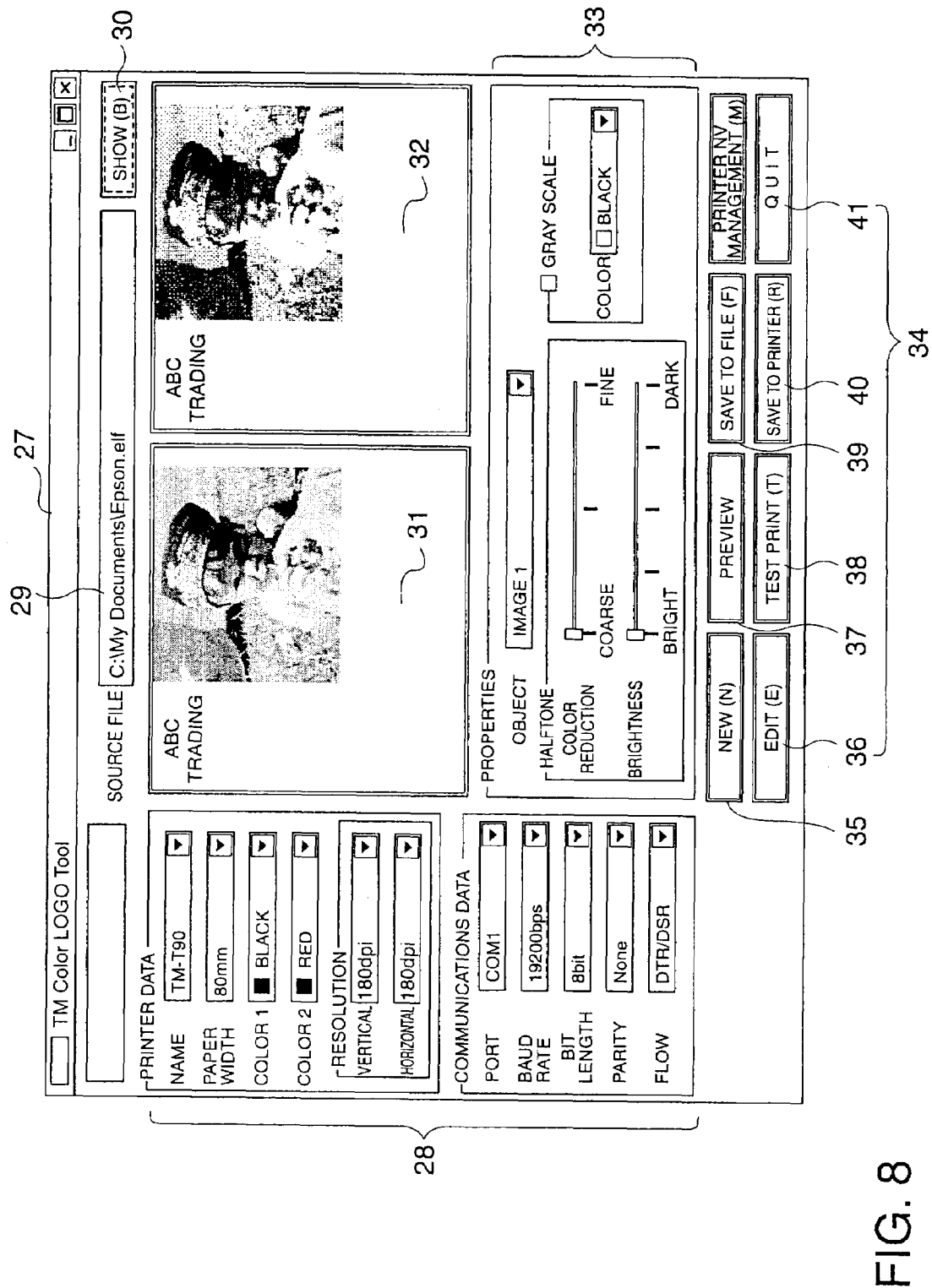
FIG. 8 shows an example of a main editing screen presented in a logo data generating system according to a preferred embodiment of the invention.

FIG. 8 shows an example of the main logo data-editing screen that may be used in a process according to the present invention for generating logo data. The main logo data editing screen 27 is a display and data input screen that can be manipulated through a graphical user interface (GUI) and is presented on a display 16 (FIG. 1 or FIG. 2) such as a CRT monitor or flat panel display. The main logo data editing screen 27 is controlled by the settings input unit 15 and display 16.

The main logo data editing screen 27 shown in FIG. 8 has a suite of model-specific data setting functions 28 for entering model identification data for the target printer, specifying the printable colors, and communication parameters; a file selection box 29 for indicating the file from which the source data is to be read; a button 30 that when selected presents a list of source data files; a source data display area 31 for viewing the source data image; a print image display area 32 for previewing the image processed logo data; an image processing parameters selection area 33 for setting the logo data editing parameters; and various control buttons 34.

The model name of the target printer (model identification data), paper size (width), printable colors 1 and 2, vertical and horizontal print resolution, port number, and such model-specific data that must be set according to the port as the baud rate, bit length, parity check, flow control settings.

The image processing parameters selection area 33 is used to control the specific image processing method by setting such parameters as the color reduction method, brightness, and gray scale level. These settings can be set using slider controls, for example. The color reduction slider can be used to adjust the color reduction process in three stages from "coarse" to "fine," corresponding to simple color reduction, dithering, and error diffusion, for example. Brightness can be controlled in five levels in this example.

If the source data is an image file, a check box (not shown in the figure) for running a process to adjust the source data to the width of the paper used by the printer could also be provided.

The control buttons 34 include a new 35, edit 36, preview 37, test print 38, save to file 39, save to printer 40, and quit 41 button.

The new 35 button is used to edit a new source data file using the logo data editing system (not shown in the figure). If this new 35 button is pressed while creating logo data, the logo data generation process is temporarily exited as described when step S36 in the ELF file editing process (FIG. 6) returns yes.

The edit 36 button is used to decide whether or not to edit source data in the ELF file format (S36). The preview 37 button is used to preview the print image shown in the print image display area 32 in a separate window in real (1:1) size. The test print 38 button is used to make a test print of the previewed logo data. The save to file 39 button is used to save the logo data as a bitmap file or executable file. The save to printer 40 button is used to store the logo data directly to the target printer. The quit 41 button is used to terminate operation of the logo data generating system.

A program for the logo data generating method described above includes an input control module for controlling input of command signals needed to generate the logo data and store the generated logo data; a display control module for controlling the display of information needed to generate logo data and store the logo data to a printer; a model-specific data reading control module for controlling reading the model-specific data for the target printer; a source data capture control module for controlling capturing the source data; a settings control module for controlling processing the source data to conform with the printer features and performance and thus generate the logo data; and an output control module for controlling output of the resulting logo data.

The logo data generating system of this invention can be achieved using a general purpose computer, e.g., a personal computer or host computer connected to a printer, or other data processing system. For example, a data storage medium recording the program described above could be read by the computer system to install the program to the computer so that the computer can be used as the logo data generating system of this invention. The data storage medium may include any known computer-readable medium for storing a program and may include, for example, a floppy disk, hard disk, CD-ROM, or other such storage medium, a network signal that may be transmitted over the Internet, or other electromagnetic carrier wave signal. The source data of the image data supplied to the printer for printing the logo can also be stored on any such computer-readable medium.

The memory for storing the printer model name and model-dependent attributes, such as the number of printable colors, print resolution, and paper width is preferably non-volatile storage, such as a hard disk or flash memory in a host computer.

The selection unit for selecting a printer model from memory controls selection of a model name displayed on a CRT, LCD or other display unit of a host computer using a mouse, keyboard, or other input device.

The logo data generating unit for processing the source data to create logo data for printing based on the model name of the target printer selected by the selection unit and the number of printable colors, print resolution, and paper width attributes of the selected target printer is controlled by a controller in the host computer.

It will be noted that this logo data generating system could also be configured so that the items included in the image processing parameters set automatically according to the model-specific data of the target printer can be changed, or so that the parameters set automatically according to the model-specific data can be changed during the logo data generation process, and that such modifications are also included in the scope of this invention. It is also possible to turn the settings for all image processing parameters based on the model-specific data off, have the user set all parameters, and process the logo data according to the user settings.

Advantages of the Invention

By storing the print resolution, printable colors, and other information specific to the target printer, reading this stored model-specific data based on input model identification data, and automatically setting the image processing parameters and communication parameters based on the model-specific data, the present invention provides a logo data generating system and logo data generating method that can quickly and easily generate logo data to be stored in the target printer, and can easily save the resulting logo data to the printer.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. An apparatus for generating logo data to be stored in and printed by a printer, the apparatus comprising:
    a source data obtaining unit configured to obtain source data used to generate the logo data;
    a reading unit configured to read model-specific data for at least one target printer from respective model-specific data stored for a plurality of printer models, wherein the at least one target printer includes memory in which the logo data is to be stored;
    a logo data generating unit configured to generate the logo data by processing the source data based on the model-specific data read by the reading unit; and
    an output unit configured to register the logo data in the printer by instructing the printer to store the logo data generated by the logo data generating unit in the printer's memory.

2. An apparatus as described in claim 1, wherein the model-specific data is limited to data that can be identified by model identification data.

3. An apparatus as described in claim 2, wherein the apparatus is adapted to disable receipt of at least some data for which setting is not required based on previously received or set control data.

4. An apparatus as described in claim 3, wherein at least some control data are initialized to respective specific values that can be changed based on other control data received by the apparatus.

5. An apparatus as described in claim 4, wherein the apparatus is adapted to enable specifying colors available for printing in the at least one target printer.

6. An apparatus as described in claim 5, wherein the apparatus is adapted to assign source data colors to specific colors printable by the at least one target printer based on the model-specific data.

7. An apparatus as described in claim 6, wherein the stored model-specific data includes communications parameters for each of the plurality of printer models, and the apparatus is adapted to set communications parameters for sending logo data to the at least one target printer based on the model-specific data.

8. An apparatus as described in claim 7, wherein registering the logo data includes the output unit outputting an executable file containing the logo data, a printer registration command for storing the logo data in the memory of the at least one target printer, and a data transmission command for sending the printer registration command and the logo data to the at least one target printer.

9. The apparatus described in claim 8, wherein opening the executable file on a host terminal causes the data transmission command to be executed causing, the logo data along with the printer registration command to be sent to the printer, which causes the printer to store the logo data in the printer's memory.

10. The apparatus described in claim 1, wherein registering the logo data includes sending a command to the printer along with the logo data to store the logo data in the memory of the target printer, so that a logo print command can be sent to the printer to print the logo data stored in the memory of the printer.

11. The apparatus described in claim 1, wherein the logo data generating unit generates the logo data by adjusting the size, color and resolution of the source data according to the characteristics of the printer described in the model-specific data.

12. An apparatus as described in claim 1, wherein the apparatus has a graphical user interface input function.

13. An apparatus as described in claim 9, the apparatus receiving unit does not display input items for which setting is not required based on received or set data.

14. An apparatus as described in claim 10, further comprising a display adapted to display an image based on the source data and an image based on data after processing by the logo data generating unit.

15. An apparatus as described in claim 11, wherein the display is adapted to display the images aligned for comparison on one side of the display.

16. A method for generating logo data to be stored in memory of a printer and printed by the printer, the method comprising the steps of:
    (a) obtaining source data;
    (b) reading, based on model identification data, model-specific data for the at least one target printer from respective model-specific data stored for a plurality of printer models;
    (c) generating logo data by processing the source data obtained in step (a) based on the model-specific data read in step (b); and
    (d) selecting a step selected from the group including step (e) and step (f) wherein,
        step (e) comprises outputting the generated logo data as an executable file containing the logo data and a data transmission command for sending the logo data and a command causing the at least one target printer to store the logo data therein; and
        step (f) comprises sending the logo data and a command causing the at least one target printer to directly store the logo data therein.

17. A method as described in claim 16, wherein step (c) comprises assigning source data colors to specific colors printable by the at least one target printer based on the model-specific data.

18. A method as described in claim 16, wherein step (c) comprises converting the size of the image represented by the source data and the resolution of that image to a paper width and print resolution, respectively, usable by the at least one target printer as specified in the model-specific data.

19. A method as described in claim 16, wherein data is received via a graphical user interface.

20. A computer readable medium storing a computer readable program of instructions for directing the execution of the method as described in claim 16.

21. The method described in claim 16, wherein sending the logo data includes sending a command to the printer along with the logo data to store the logo data in the memory of the target printer, so that a logo print command can be sent to the printer to print the logo data stored in the memory of the printer.

22. The method described in claim 16, wherein opening the executable file on a host terminal causes the data transmission command to be executed causing, the logo data along with the printer registration command to be sent to the printer, which causes the printer to store the logo data in the printer's memory.

23. The method described in claim 16, wherein the logo data is generated by adjusting the size, color and resolution of the source data according to the characteristics of the printer described in the model-specific data.

* * * * *